(12) United States Patent
Falk

(10) Patent No.: US 6,760,301 B1
(45) Date of Patent: Jul. 6, 2004

(54) AUTOMATIC CROSSOVER CONFIGURATION FOR SERIAL DATA LINKS

(75) Inventor: Peter R. Falk, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/480,721

(22) Filed: Jan. 7, 2000

(51) Int. Cl.[7] .......................... H04L 12/28; H04L 12/56
(52) U.S. Cl. ..................... 370/225; 370/282; 370/422; 375/220; 455/79
(58) Field of Search ................. 370/225–278, 370/282, 285, 422, 423; 375/219, 220, 222, 257, 258; 340/2.1, 2.5; 455/73, 78, 79, 88; 330/9, 276, 69; 307/416

(56) References Cited

U.S. PATENT DOCUMENTS

| | | | | |
|---|---|---|---|---|
| 4,809,297 A | * | 2/1989 | Polansky et al. | ........... 375/220 |
| 5,247,540 A | * | 9/1993 | Hoge | ........................ 375/220 |
| 5,311,114 A | * | 5/1994 | Sambamurthy et al. | ..... 370/296 |
| 5,577,023 A | * | 11/1996 | Marum et al. | ............... 370/225 |
| 5,625,621 A | * | 4/1997 | Christensen et al. | ........ 370/248 |

* cited by examiner

Primary Examiner—Chi Pham
Assistant Examiner—Afsar Qureshi
(74) Attorney, Agent, or Firm—Hickman Palermo Truong & Becker

(57) ABSTRACT

One or more nodes of a data communication system is automatically switched between two or more possible node configurations, such as between a DTE configuration and a DCE configuration, until the presence of a carrier or similar indicator signal is sensed. Configuration devices include relays and electronic switches. Control devices preferably are microprocessor based. In one aspect, upon power up or other initiation, the microprocessor toggles an output control signal so as to repeatedly toggle a switch between, e.g., DTE and DCE positions and to terminate the toggling when a link indicator is detected.

13 Claims, 4 Drawing Sheets

AUTOMATIC CROSSOVER CONFIGURATION FOR SERIAL DATA LINKS

The present invention is related to configuring equipment in a communication system and in particular to providing desired pin or cable connections for full duplex network data communications.

BACKGROUND INFORMATION

Equipment in a data communication or network system is typically connected by using cables, fiber optics and the like, to establish serial data communication links between the equipment. A number of different standards for connectors, cabling and the like have been used or proposed, including, for example, 10 base-T systems, T1 systems, RS-232 systems, and other systems and links.

At least some systems can be configured for full duplex communication allowing communications which are outbound (with respect to particular equipment in the system) to occur simultaneously with communications which are in-bound. Typically, this means that the equipment will be provided with separate connector pins for out-bound (transmitter or TX) signals and for in-bound (receiver or RX) signals. In at least some systems, equipment is provided in which a set of pins to be used for RX and TX signals can be configured (e.g. manually configured by the user) in either of two configurations. For example, in certain RS-232 systems equipment may be configured by the user as data communication equipment (DCE) in which a first pin or set of pins (e.g. pin 2) is provided as a TX pin and another pin or set of pins (e.g. Pin 3) is established as the RX pin. Alternatively, the user may manually configure the equipment as data terminal equipment (DTE) with the opposite configuration, e.g. in which pin 2 is the RX pin and pin 3 is the TX pin. Typically, which configuration should be used (i.e. DCE or DTE) depends upon the configuration of the other equipment to which a device is connected. In general, connected devices should have opposite configurations such that equipment which is connected to DCE should be configured as DTE and equipment which is connected to DTE should be configured as DCE.

In many situations, the configuration choices for end users can be confusing and/or time-consumptive and expensive. End users may not know how a particular piece of equipment should be configured for proper operation. This may require a time-consumptive trial-and-error procedure for setting up a communication system or network, which can be relatively expensive, especially when a system contains multiple terminals or nodes. Accordingly, it would be useful to provide a system which can achieve substantially automatic configuration for establishing a full duplex data link, i.e., without the need for manual switching between potential configurations or other similar trial-and-error techniques, especially without the need for a human user to select or implement a choice among two or more possible configurations. Preferably, the automatic configuration system can be implemented in a fashion which is relatively easy to design, fabricate, maintain and/or repair and which is relatively inexpensive, especially in terms of a price to an end user, for the equipment.

SUMMARY OF THE INVENTION

The present invention includes a recognition of the existence, nature and/or source of the problems in previous approaches, including as described herein. In one aspect, the communication equipment or terminal equipment is provided with an electrically controllable switch, for changing between two or more configurations (e.g. changing between DTE and DCE configurations) and a control device which receives signals indicative of whether a desired communication link has been established, and which toggles the switch, among the possible configurations, until such time as a desired link is detected. In one embodiment, the control circuitry includes circuitry which is already present in the communication device for other purposes, such as a microprocessor. Thus, in one aspect the invention can be implemented by, among other things, providing programming to a microprocessor so as to control a switch and/or to recognize the existence of a desired communication link.

In various aspects, the switch may comprise a electromagnetic actuator, i.e. a relay, or the switch may comprise a plurality of switchable amplifiers, i.e. an electronic switch.

In one aspect one or more nodes of a data communication system is automatically switched between two or more possible node configurations, such as between a DTE configuration and a DCE configuration, until the presence of a carrier (or actual data) or similar indicator signal is sensed. Configuration devices include relays and electronic switches. Control devices preferably are microprocessor based. In one aspect, upon power up or other initiation, the microprocessor toggles an output control signal so as to repeatedly toggle a switch between, e.g., DTE and DCE positions and to terminate the toggling when a link indicator is detected. In some embodiments, if desired control devices and/or switching devices can be integrated together with other functions, e.g. a modulator/demodulator in an Ethernet transceiver.

DETAILED DESCRIPTION OF THE PREFERRED EMBODIMENT

Figure 1A:
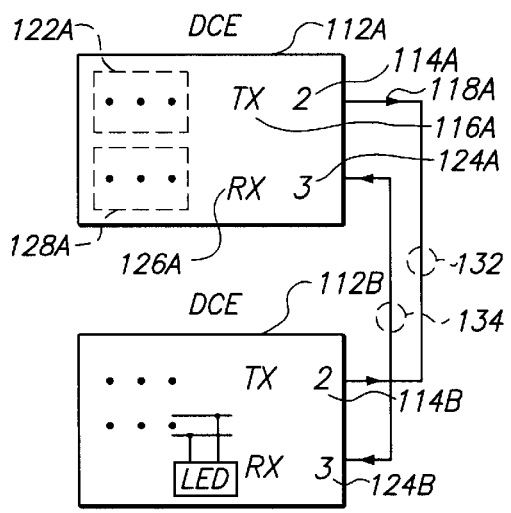
FIGS. 1A, B & C depict possible relationships of various configurations of data equipment in a data communication system.

In the configuration of FIG. 1A, first communication equipment is configured as data communication equipment (DCE), 112a such that one of the pins (in this case, pin 2 114a) of a first cable connector is configured as a transmit pin 116a (i.e. for outbound 118a communications) such as by having signals from pin 2 114a coupled to transmit circuitry 122a. In the illustration of FIG. 1A, pin 3, 124a is configured for inbound communication, i.e. as an RX pin 126a such that signals from pin 3 are provided to receiver circuitry 128a. In the embodiment of FIG. 1A, other equipment 112b to which the first equipment 112a is coupled is also configured as DCE, i.e., with pin 2 114b configured as a transmit pin and pin 3 124b configured as a receive pin.

The configuration depicted in FIG. 1A is an improper configuration. The system is improper because both nodes have the same configuration, i.e. both are configured as DCE equipment. As a result, both systems will be transmitting on the same line (in this case, the line 132 coupled to pin 2 of both devices 114a, 114b) and both devices will be listening to (i.e. expecting communications on) the same line (in this case, line 134, coupled to pin 3 124a, b of each device).

Figure 1B:
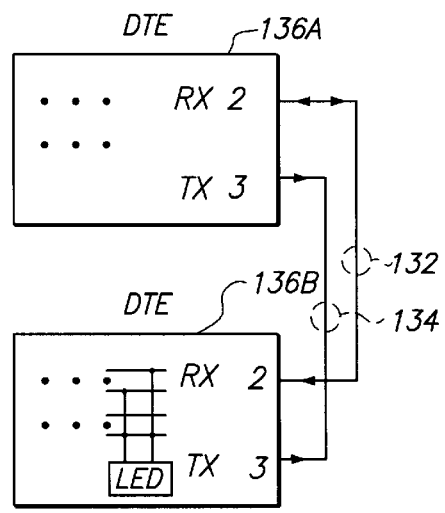

In the illustration of FIG. 1B, both devices 136a, 136b are configured as DTE. This configuration is also improper. As can be seen from FIG. 1B, in the configuration of FIG. 1B, both devices will be attempting to transmit on one of the lines 134 and both will be listening to the other line 132.

Figure 1C:
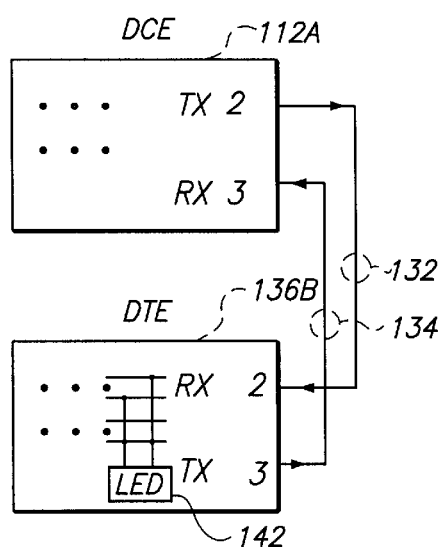
Figure 3:
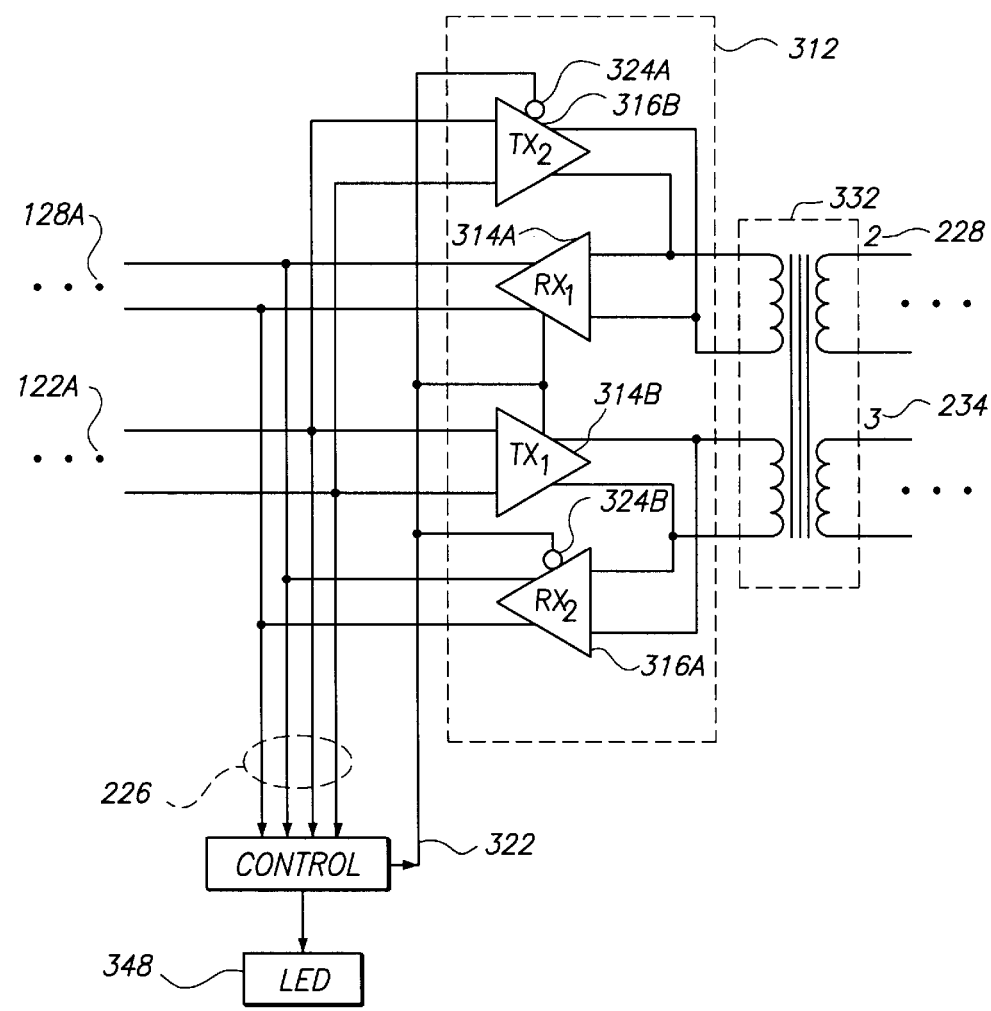
FIG. 3 depicts an automatic configuration device according to an embodiment of the present invention.

The illustration of FIG. 3 depicts a configuration in which the equipment is properly configured, i.e. one node is configured as DCE 112a and the other node is configured as DTE 136b. In the illustration of FIG. 1C, the first node 112a will transmit signals on pin 2 for conveyance, by line 132 to pin 2 of the second node 136. However, in node 136b, pin 2 is configured as RX so that node 136b can receive, on pin 2, the communications transmitted from pin 2 of the first node 112a. Similarly, the first node 112a receives communications on pin 3, over line 134 which were transmitted from pin 3 of the second node 136b. In this way, full duplex communication is achieved.

In at least some previous approaches, it was possible to manually reconfigure at least some equipment between DCE and DTE configurations. Thus, in previous approaches, in order to achieve a desired full duplex communication, an end user could, if desired, connect a system, e.g. as depicted in FIG. 1A. The user, would, however, find that full duplex communication had not been achieved. Accordingly, in previous approaches, a end user could then manually reconfigure, e.g. the second terminal 112b to change it from a DCE configuration, to a DTE configuration, e.g. as depicted in FIG. 1C. Manual reconfiguration in previous approaches could, depending upon the equipment, be achieved by manually throwing a switch (e.g. for routing signals from pin 3 to TX and routing signals from pin 2 to RX or similar switch configurations). Other approaches could involve moving or modifying cable connectors, swapping or reconfiguring cables and the like. As depicted in FIG. 1C, in some devices, an indicator, such as an LED, could be connected to illuminate in response to the presence of, e.g. a carrier signal, to visually indicate to a user whether or not a carrier signal was present and thus assist a user in performing the manual reconfiguration as described above.

Figure 2:
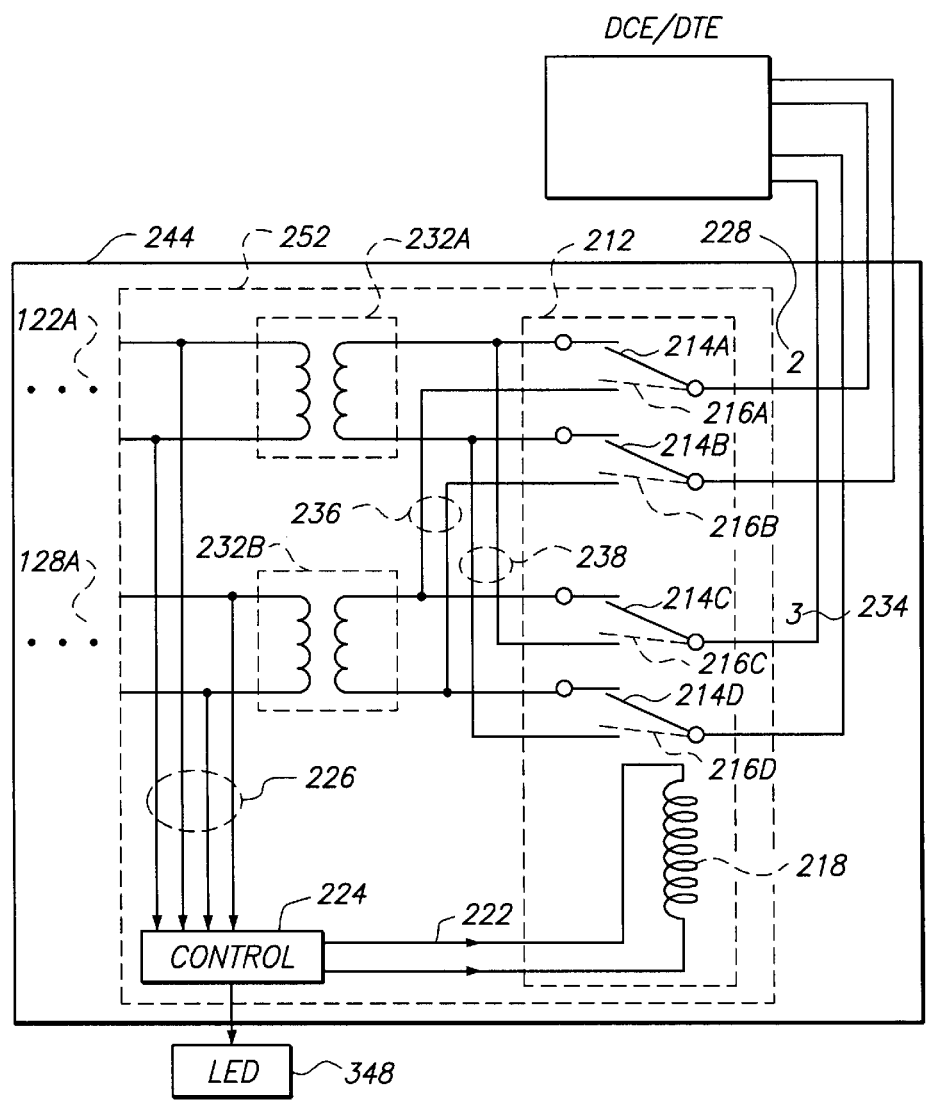
FIG. 2 depicts an automatic configuration device according to an embodiment of the present invention.

FIG. 2 depicts a system providing for automatic configuration. In FIG. 2, signals from pins 2 and 3, respectively, are provided on either a first path or a second path depending upon whether a switch (preferably an electrically controlled switch, e.g. a relay) 212 is in a first position 214abcd or a second position (shown in phantom, 216a,b,c,d). An electromagnetic actuator, or similar actuator 218 is configured for changing all four switches between the first configuration 214a,b,c,d and the second configuration 216a,b,c,d (i.e. providing quadruple pole double throw operation). In response to signals 222 output by a control device 224. The control device 224 can receive and monitor signals 226 from either or both of the lines coupled to the transmit circuitry 122a or the receive circuitry 128b.

In the first path (defined when the switch 212 is in the first position 214a,b,c,d) signals from pin 2 228 are provided (via a first protective transformer 232a) to transmit circuitry 122a and signals from the third pin 234 are provided (via a second protective transformer 232b) to receiver circuitry 128a. When the control circuitry 224 controls the electromagnet 218 so as to place the switches in the second position 216abcd, signals at the first at pin 2 228 are provided, via crossover lines 236 to the RX circuitry 128a and signals at the third pin 234 are provided, via crossover circuitry 238 to the TX circuitry 122a. In this way, when the switches 212 are in the first position 214abcd, the equipment 244 is configured as DCE and when the switches are in the second position 216abcd, the equipment 244 is configured as DTE.

Although a number of devices can be used as control devices 224, in one embodiment, the control device 224 includes components which are normally in communication equipment 244 for other purposes, such as a microprocessor which can be configured to have the functionality needed for automatic configuration included by including additional or different programming. Those of skill in the art will understand how to add or modify programming to achieve the desired microprocessor operation, after understanding the present disclosure.

Figure 4:
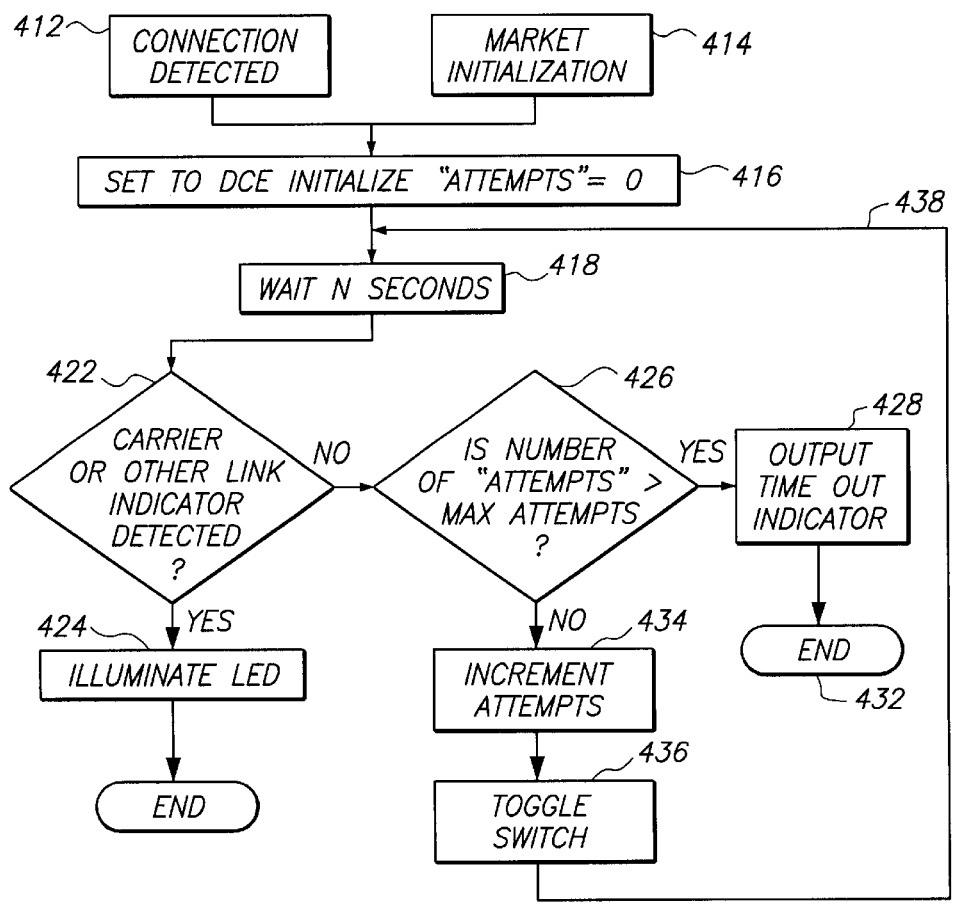
FIG. 4 is a flow chart depicting a procedure, which may be implemented in software, for configuring equipment according to an embodiment of the present invention.

FIG. 4 depicts an automatic configuration procedure that can be implemented, e.g. by programming a microprocessor control device 224, according to an embodiment of the present invention. In the illustration of FIG. 4, the configuration procedure can be initiated automatically (e.g., upon detecting that a cable or similar connection has been provided 412) and/or manually 414 (such as by an operator inputting a configuration request or similar input, e.g. using a keyboard, switch, button, or other input device). For example, an operator may manually initiate the configuration procedure when cables are first connected to equipment or when a malfunction or other event has occurred. In one embodiment, configuration is automatically initiated upon power up of the equipment 244.

In the illustration of FIG. 4, the procedure begins by selecting one of the possible configurations, in this example, a DCE configuration, as the initial attempt and initializing a "attempts" counter variable to zero 416. For example, setting to a DCE configuration might, in one embodiment, be achieved by causing the microprocessor to output a predetermined voltage (e.g. plus 12 volts) on an output line 222 to the switch actuator 218. After setting the device to the initial DCE configuration, the system will wait a predetermined period of time, such as a predetermined number (N) of seconds 418. The value of N will depend on a number of factors including the expected delay time between an initial correct configuration and the receipt of a carrier signal or other link indicator. In one embodiment, N is between about 0.1 seconds and about 5 seconds, preferably between about 0.5 seconds and about 2 seconds.

After waiting a period of time 418, the control device 224 will check the status of the incoming signals 226 to determine whether a carrier signal or other link indicator is detected 422. Those of skill in the art will understand how to program or configure a microprocessor or other control device for detecting a carrier signal or link indicator and how to control a microprocessor or similar device for outputting switching signals 222, 322, after understanding the present disclosure. If a carrier signal or link indicator is detected, the system preferably illuminates an indicator such as an LED 424, 348 so that a user can visually verify that the automatic system has completed its configuration. If a carrier or other link indicator is not detected, the system will compare the value of the "attempts" variable to a predetermined maximum number of attempts 426. For example, the configuration the process could be configured such that after the system has toggled between different configurations, e.g., ten times, the system will output a timeout indicator (428, such as illuminating a second LED (not shown) or providing other output) and will end the initiation process 432. However, if a timeout has not yet occurred, the system will increment the "attempts" variable 434 and then output a signal 222 to toggle the switch 212 to a different configuration 436, e.g. causing the microprocessor to output a second signal over an output line 222 (e.g. a minus 12 volt signal) causing the switch 212 to move to the second position 216a,b,c,d. After toggling to a new configuration, the system loops 438 to wait a period of time 418 before evaluating for the presence of a carrier 422 under the new configuration. As seen in FIG. 4, the procedure will continue to change configurations, and evaluate for the presence of a link indicator, until such time as a link is detected 424 or a timeout occurs 428.

As can be seen in the systems depicted in FIGS. 1a,b,c, it would be possible to provide automatic configuration components 252 in any of the various equipment nodes 112a, 112b, 136a, 136b of communication systems. For example, it would be possible to routinely configure both hubs and personal computers, (PCs) in a PC network, so that both hubs and the PCs can perform configuration as described. However, depending on items such as the value of N and the like, there is a risk that if both ends of a communication link are attempting to configure themselves, both devices could constantly be switching between inappropriate configuration (i.e. both could be simultaneously switching between the configuration of FIG. 1A and the configuration of FIG. 1B) and thus may never achieve the desired configuration (FIG. 1C). Accordingly, in one embodiment, such "thrashing" is avoided by employing a convention such that only devices of one type (e.g. only PCs, but not hubs) are provided with configuration capability. In another approach to avoid thrashing, the value of N is selected randomly from a set of potential values, or from a range of values, each time the device is used or powered-up. In another embodiment, a convention is developed such that the value of N for one class of devices (e.g. hubs) is very different (e.g. by a factor of 10 or more) from the value of N and any other class of devices (e.g. PCs). In this way, a hub might remain in its initial configuration for, e.g., 20 seconds while the PC could cycle through configurations once every two seconds, thus avoiding a thrashing situation. However, if a self-configuring hub was coupled to a nonself-configuring PC (e.g. a prior art PC) the system, as a whole, would still be self-configuring by virtue of the self-configuring procedure performed by the hub.

FIG. 3 depicts configuration circuitry similar in effect to that depicted in FIG. 2, but providing for electronic switching 312, rather than relay-type switching 212. In the configuration of FIG. 3, the electronic switching 312 can be relatively vulnerable to voltage spikes and the like and accordingly, in the embodiment of FIG. 3, the protective transformer 332 is positioned "upstream" of the switch 312. In the embodiment of FIG. 3, when a control signal 322 has a first value (e.g. plus 12 volts) a first RX differential amplifier 314a and a first TX differential amplifier 314b are coupled to pins 2 and 3 respectively 228 234 for providing signals to and from RX circuitry 128a and TX circuitry 122a respectively. In the embodiment of FIG. 3, the control signal is inverted (e.g. to −12 volts) 324a 324b so as to substantially disable a second receiver differential amplifier 316a and differential TX amplifier 316b when the control signal 322 is plus 12 volts. However, when the control signal 322 which is output has the opposite value (e.g. −12 volts) the first set of amplifiers 314ab is disabled and the second set of amplifiers 316ab is enabled. Accordingly, signals from pin 2 228 are coupled, via transmit amplifier 316b to the transmit circuitry 122a and signals at pin 3 234 are coupled, via the RX amplifier 316a to RX circuitry 128a.

In light of the above discussion, a number of advantages of the present invention can be seen. The present invention can provide a system in which equipment can be automatically configured as DCE or DTE (or among similar potential configurations) i.e. without the need for human input such as setting of switches, configuring or moving cables, selecting cables or connectors and the like. The automatic configuration can be provided in a manner which is relatively easy and inexpensive to implement, e.g. including using a microprocessor or other device which is already present in the equipment for other purposes. The present invention can reduce or avoid delay associated with previous manual, typically trial and error, configuration procedures. The present invention can be implemented in context in which end users do not and/or cannot know whether the equipment at the other end is configured as DCE or DTE. The present invention can assist in avoiding damage to equipment and/or data loss that can occur if equipment is improperly coupled and/or configured. Although certain examples discussed above relate to differential signal systems, it is possible to implement some or all features of the present invention in systems using other than differential signals, and accordingly embodiments of the present invention can be implemented in the context of single-ended signals.

A number of variations and modifications of the invention can be used. It is possible to use some aspects of the invention without using others. For example, it is possible to provide automatic configuration without providing for a visual display of a detected link indicator. It is possible to provide the present invention while still accommodating manual configuration if manual configuration is desired. Although embodiments of the present invention were described in the context of a 10-base T link, the present invention can be implemented in other systems including (without limitation) T1 systems, RS-232 systems, RS-488 systems, and other systems Although in embodiments described above, the device was described as repeatedly toggling between or among two or more configurations, is also possible to configure device which tries each possible configuration only once such as by trying a first configuration and, if no link signal is detected, switching to a second configuration and stopping. Although embodiments were described in which the control equipment or device includes a microprocessor, it is also possible to provide control by other means such as programmable logic arrays, application specific integrated circuits, hard-wired logic and the like. Although embodiments were described in which there are two possible configurations, the present invention can be used in connection with devices where three or more configurations are possible. Although in the embodiment of FIG. 4, the occurrence of a timeout 428 ends the initiation or configuration procedure 432, in another embodiment, one or more occurrences of a timeout 428 can be followed by changing parameters such as the number of wait seconds 418 and continuing attempts to achieve a desirable configuration.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus for configuring a node in a data communication system comprising:

an electrically-controllable switch, changeable, in response to a control signal, between a first position, coupling first and second pins to receiver and transmitter circuitry respectively, and a second position, coupling said first and second pins to transmitter and receiver circuitry, respectively; and control circuitry communicatively coupled to the electrically-controllable switch and being configured to generate and provide the control signal to the electrically-controllable switch in a manner to cause the electrically-controllable switch to toggle between the first and second positions until a data signal is detected indicating that a full duplex T1 or full duplex RS-488 communications link has been established.

2. Apparatus, as claimed in claim 1, wherein said control circuitry comprises a microprocessor.

3. Apparatus, as claimed in claim 1, wherein said electrically-controllable switch comprises a relay.

4. Apparatus, as claimed in claim 1, wherein said electrically-controllable switch comprises an electronic switch.

5. A method for configuring a node of a data communication systems, said node including a communications coupler having a plurality of pins for forming a full duplex T1 or full duplex RS-488 communications link with at least one other node, the method comprising:

coupling a controllable switch to at least first and second pins of said node wherein said controllable switch provides communication at said second pin to receiver circuitry and provides communication at said first pin to transmitter circuitry when said controllable switch is in a first position and wherein said controllable switch provides communication at said second pin to said transmit circuitry and provides communication at said first pin to said receiver circuitry when said controllable switch is in a second position, said controllable switch being in said first position in response to a first control signal and in said second position in response to a second control signal;

automatically generating and providing the first and second control signals to the controllable switch in a manner to cause the controllable switch to toggle between the first and second states; and terminating providing the first and second control signals to the controllable switch in response to sensing a communications data signal indicating that the full duplex T1 or full duplex RS-488 communications link has been established.

6. A method for configuring a node of a data communication systems, said node including a communications coupler having a plurality of pins for forming a full duplex T1 or full duplex RS-488 communications link with at least one other node, the method comprising:

coupling a controllable switch to first and second pins of said node wherein said controllable switch provides communication at said first pin to receiver circuitry and provides communication at said second pin to transmitter circuitry when said controllable switch is in a first position and wherein said controllable switch provides communication at said first pin to said transmitter circuitry and provides communication at said second pin to said receiver circuitry when said controllable switch is in a second position, said controllable switch being in said first position in response to a first control signal and in said second position in response to a second control signal;

automatically generating and providing the first and second control signals to the controllable switch in a manner to cause the controllable switch to toggle between the first and second states; and terminating providing the first and second control signals to the controllable switch in response to sensing a communications data signal indicating that the full duplex T1 or full duplex RS-488 communications link has been established.

7. A method, as claimed in claim 6, wherein said controllable switch comprises a relay.

8. A method, as claimed in claim 6, wherein said controllable switch comprises an electronic switch.

9. An apparatus for automatically configuring a node of a data communication systems, said node including a communications coupler having a plurality of pins for forming a full duplex T1 or full duplex RS-488 communications link with at least one other node, the apparatus comprising:

controllable means, changeable between first and second states, for providing communication at a first pin to receiver circuitry and providing communication at a second pin to transmitter circuitry when said controllable means is in said first state and for providing communication at said first pin to said transmitter circuitry and providing communication at said second pin to said receiver circuitry when said controllable means is in said second state, said controllable means being in said first state in response to a first control signal and in said second state in response to a second control signal;

means for automatically generating and providing the first and second control signals to the controllable means in a manner to cause the controllable means to toggle between the first and second states; and means for terminating the providing of the first and second control signals to the controllable means in response to sensing a communications data signal indicating that the full duplex T1 or full duplex RS-488 communications link has been established.

10. Apparatus, as claimed in claim 9, wherein said means for generating and providing the first and second control signals to the controllable means comprises a microprocessor.

11. Apparatus, as claimed in claim 9, wherein said means for terminating comprises a microprocessor.

12. Apparatus, as claimed in claim 9, wherein said controllable means comprises a relay.

13. Apparatus, as claimed in claim 9, wherein said controllable means comprises an electronic switch.

* * * * *